(12) United States Patent
Gehret et al.

(10) Patent No.: US 7,395,745 B2
(45) Date of Patent: Jul. 8, 2008

(54) TRUNNION ASSEMBLY FOR SAWS

(75) Inventors: Robert S. Gehret, Hampstead, MD (US); Torrey R. Lambert, Baltimore, MD (US)

(73) Assignee: Black & Decker Inc., Newark, DE (US)

( * ) Notice: Subject to any disclaimer, the term of this patent is extended or adjusted under 35 U.S.C. 154(b) by 80 days.

(21) Appl. No.: 11/181,551

(22) Filed: Jul. 14, 2005

(65) Prior Publication Data
US 2006/0048617 A1 Mar. 9, 2006

Related U.S. Application Data

(60) Provisional application No. 60/606,935, filed on Sep. 3, 2004.

(51) Int. Cl.
*B27B 5/24* (2006.01)
*B23D 45/04* (2006.01)

(52) U.S. Cl. .................. 83/471.3; 83/473; 83/468.3; 83/490; 83/581; 83/698.11

(58) Field of Classification Search ............... 83/471.3, 83/397, 373, 471.1, 564, 471.5, 581, 486.1, 83/471.2, 485, 698.11, 477.2, 474, 484, 574, 83/786, 468.3, 473, 522.8, 490, 522.18, 468.2, 83/698.1; 248/637, 646, 671, 676; 30/390, 30/391
See application file for complete search history.

(56) References Cited

U.S. PATENT DOCUMENTS

| | | | | |
|---|---|---|---|---|
| 1,627,275 A * | 5/1927 | Costello et al. ............... 16/340 |
| 3,087,519 A | 4/1963 | McCarty et al. |
| 4,574,670 A | 3/1986 | Johnson |
| 5,220,857 A * | 6/1993 | Freeburger ................. 83/468.3 |
| 5,235,889 A * | 8/1993 | Brickner et al. ............ 83/471.3 |
| 5,437,319 A * | 8/1995 | Garuglieri ................. 144/286.1 |
| 5,513,548 A * | 5/1996 | Garuglieri .................... 83/397 |
| 5,517,763 A | 5/1996 | Schilling et al. |
| 5,590,991 A * | 1/1997 | Garuglieri ................... 411/354 |
| 5,829,333 A * | 11/1998 | Itzov ......................... 83/471.3 |
| 5,896,798 A * | 4/1999 | Garuglieri ................. 83/477.1 |
| 6,021,700 A * | 2/2000 | Garuglieri ................. 83/468.1 |
| 6,142,051 A * | 11/2000 | Garuglieri ................. 83/471.3 |
| 6,474,207 B1 * | 11/2002 | Itzov ......................... 83/471.3 |

(Continued)

FOREIGN PATENT DOCUMENTS

EP 0 860 250 A 8/1998

OTHER PUBLICATIONS

D. Chariot, European Search Report, Dec. 12, 2005, The Hague.

(Continued)

*Primary Examiner*—Ghassem Alie
(74) *Attorney, Agent, or Firm*—Adan Ayala

(57) ABSTRACT

A power tool with a base assembly, and a table supported by the base assembly, where the table has a workpiece supporting surface. A saw assembly is pivotably supported by the table via a trunnion assembly. The table includes a post having a first curved surface having a first radius. The trunnion has a first surface contacting the first curved surface. The trunnion is movable along the first curved surface. The first radius is larger than the distance between the first surface and the workpiece supporting surface.

20 Claims, 5 Drawing Sheets

U.S. PATENT DOCUMENTS

| | | |
|---|---|---|
| 6,865,976 B2 * | 3/2005 | Parks et al. ................ 83/471.3 |
| 2002/0100351 A1 * | 8/2002 | Bean et al. ................ 83/471.3 |
| 2003/0024366 A1 | 2/2003 | Hollinger et al. |
| 2004/0089125 A1 | 5/2004 | Schoene et al. |

OTHER PUBLICATIONS

Annex to the European Search Report on European Patent Application No. EP 05 01 8143.

* cited by examiner

TRUNNION ASSEMBLY FOR SAWS

REFERENCE TO CROSS-RELATED APPLICATION

The present application derives priority under 35 USC § 119(e) from U.S. Patent Application No. 60/606,935, filed Sep. 3, 2004.

FIELD OF THE INVENTION

This invention relates generally to a trunnion assembly for a saw and more specifically to a trunnion assembly for a combination table/miter saw.

BACKGROUND OF THE INVENTION

Typical miter saws have a trunnion assembly that allows the saw assembly to be beveled relative to a table. Typically, the bevel axis is coplanar with the table. In a combination table/miter saw, such arrangement may be undesirable, as, when the saw is used in table saw mode, the bevel axis will be underneath the table surface supporting the workpiece. It is an object of the invention to provide a trunnion assembly for such combination table/miter saw.

SUMMARY OF THE INVENTION

In accordance with the present invention, an improved trunnion assembly is employed. The power tool has a base assembly, a table supported by the base assembly, the table having a workpiece supporting surface, and a saw assembly pivotably supported by the table via a trunnion assembly, wherein the table includes a post having a first curved surface having a first radius, the trunnion having a first surface contacting the first curved surface, the trunnion being movable along the first curved surface, the first radius being larger than the distance between the first surface and the workpiece supporting surface.

Additional features and benefits of the present invention are described, and will be apparent from, the accompanying drawings and the detailed description below.

BRIEF DESCRIPTION OF THE DRAWINGS

The accompanying drawings illustrate preferred embodiments of the invention according to the practical application of the principles thereof, and in which:

FIG. 1 illustrates a combination table/miter saw according to the invention, whereas

FIG. 2 illustrates a trunnion assembly according to the invention, where FIG. 2A shows a cross-sectional view taken along plane II-II in FIG. 2B; and.

FIG. 3 illustrates an alternate trunnion assembly according to the invention, where FIG. 3A shows a cross-sectional view taken along plane II-III in FIG. 3B.

DETAILED DESCRIPTION

Figure 1A:
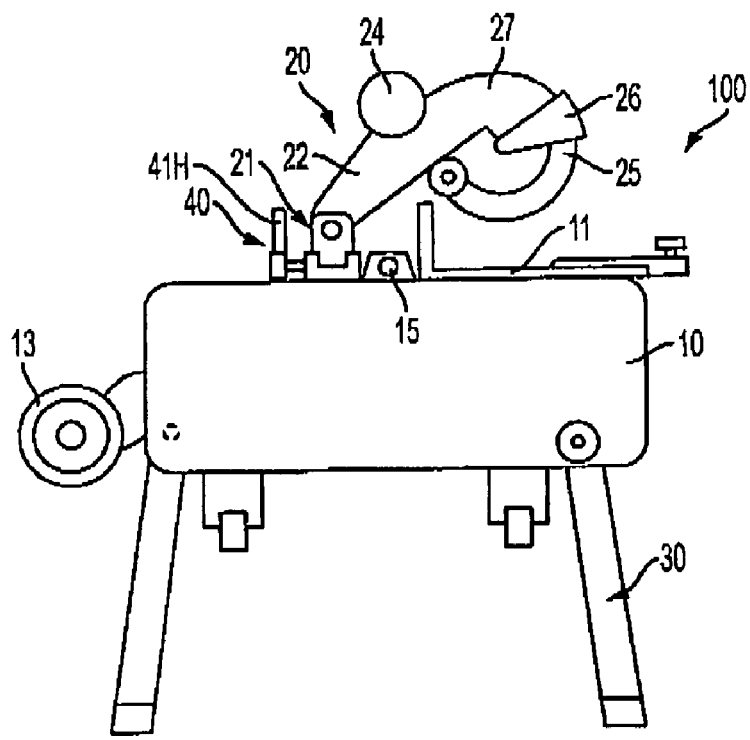
FIGS. 1A-1B are side views of the combination table/miter saw in the miter saw and table saw modes, respectively.

The invention is now described with reference to the accompanying figures, wherein like numerals designate like parts. Referring to FIG. 1, a combination table/miter saw 100 may include a base assembly 10, a table assembly 11 supported by base assembly 10, and a saw assembly 20 supported by the table assembly 11. Saw assembly 20 may include a trunnion assembly 21 disposed on the table assembly 11, a pivotable arm 22 pivotably attached to trunnion assembly 21, a motor 24 supported by the arm 22 and driving a blade 23. Arm 22 also supports upper blade guard 27, which covers an upper part of blade 23. Lower blade guard 25 is pivotally attached to upper blade guard 27. An auxiliary blade guard 26 may be pivotably connected to lower blade guard 25.

Preferably, table assembly 11 is pivotally attached to base assembly 10 via joint 15 so that, when the table assembly 11 is in the orientation of FIG. 1A, the saw assembly 20 can act as a miter saw, i.e., saw assembly 20 can be pivoted downwardly towards table assembly 11 to cut a workpiece placed on table assembly 11.

Figure 1B:
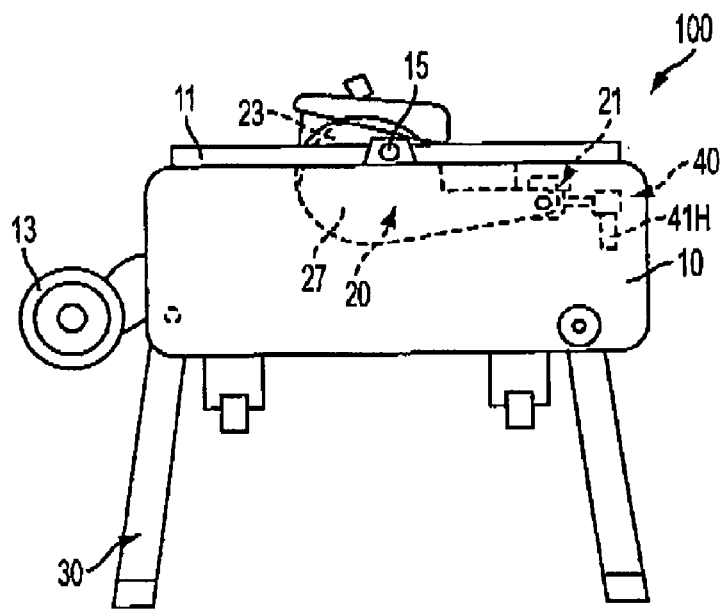

On the other hand, when table assembly 11 is rotated via joint 15 to the orientation of FIG. 1B, the saw 100 acts as a table saw, i.e., saw assembly 20 will be supported by and disposed underneath the table assembly 11. In such orientation, blade 23 extends through the table assembly 11, so that a user can dispose a workpiece on table assembly 11 and push it towards blade 23 for cutting.

Persons skilled in the art will recognize that the invention described below can be applicable to non-combined miter saws and non-combined table saws.

Preferably, base assembly 10 has at least one wheel 13 thereon.

Base assembly 10 may also support four leg assemblies 30. Preferably leg assemblies 30 are pivotally attached to base assembly 10.

Figure 2A:
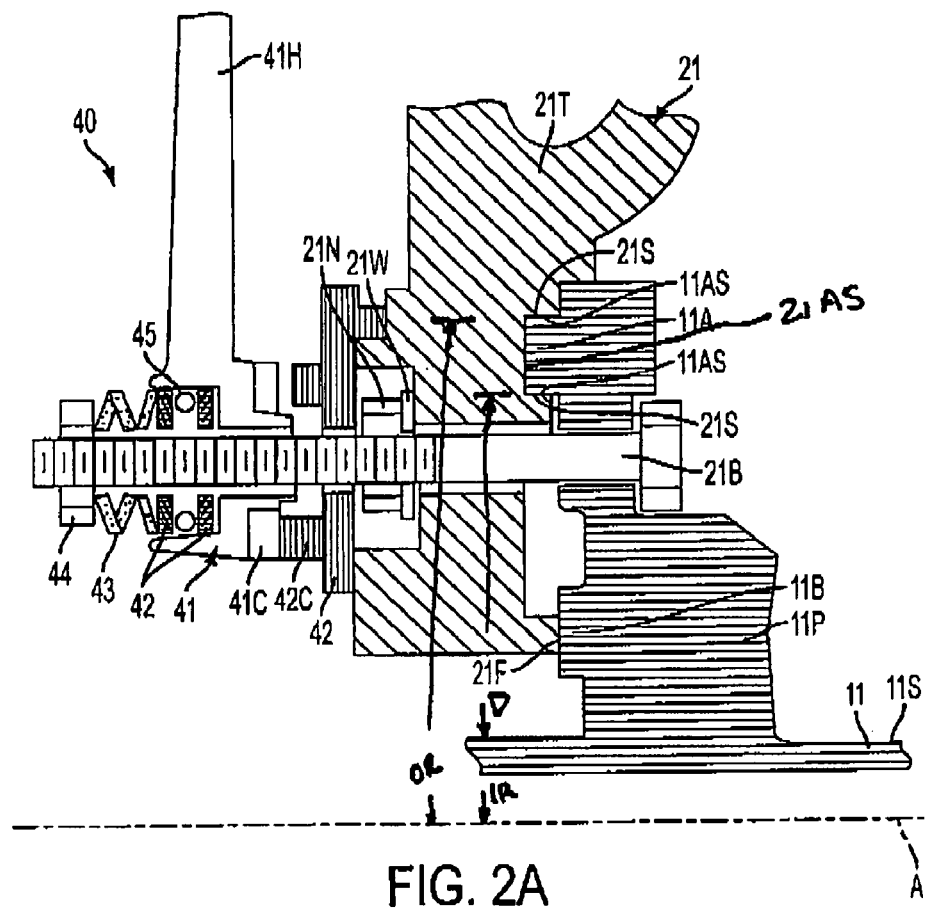
FIGS. 2A-2B are cross-sectional and rear perspective views, respectively.

Referring to FIG. 2, table assembly 11 may have a post 11P with a curved flange 11A. Trunnion assembly 21 may include a trunnion 21T which pivotally supports arm 22. Trunnion 21T has two bearing surfaces 21S sandwiching curved flange 11A and contacting surfaces 11AS of curved flange 11A. Preferably surfaces 11AS, 21S are machined to minimize play therebetween.

A bolt 21B extends through post 11P and trunnion 21T. A nut 21N threadingly engages bolt 21B to capture trunnion 21T between nut 21N and post 11P. A washer 21W may be provided between nut 21N and trunnion 21T to minimize friction therebetween.

Trunnion 21T may also have a flange 21F contacting a surface 11B of post 11P. Such contact reduces the forces acting on surfaces 11AS, 21S.

Persons skilled in the art will recognize that saw assembly 20 can be beveled by moving surfaces 21S (and thus trunnion 21T) along surfaces 11AS of curved flange 11A. Trunnion 21T does not pivot about bolt 21B because trunnion 21T has an arcuate slot 21AS that allows trunnion 21T to change its rotational position, even though bolt 21B does not move therealong.

Surfaces 11AS are preferably curved and concentric. Preferably, the radii IR, OR of surfaces 11AS are larger than the distance D between curved flange 11A and table surface 11S. Persons skilled in the art will recognize that curved flange 11A thus defines a bevel axis A that is underneath table surface 11S.

It is preferable to provide a bevel lock assembly 40 to lock trunnion 21T in a desired bevel position. Bevel lock assembly 40 preferably comprises a lock lever 41, which is rotatably disposed on bolt 21B. Lock lever 41 may include a handle 41H for rotating lock lever 41. A locking plate 42 is disposed between lock lever 41 and trunnion 21T. Bolt 21B preferably extends through locking plate 42.

Lock lever 41 and locking plate 42 preferably have corresponding cam surfaces 41C, 42C, respectively. With such arrangement, the user need only rotate lock lever 41 to fix the bevel angle of trunnion 41T. When lock lever 41 is rotated, cam surfaces 41C, 42C contact, forcing locking plate 42 into trunnion 21T and sandwiching trunnion 21T into locking contact between locking plate 42 and post 11P.

A nut 44 may be disposed on bolt 21B to limit movement of lock lever 41 along the axis of bolt 21B. A spring 43, washers 42 and thrust bearing 45 may be disposed between nut 44 and lock lever 41. During the locking operation, rotation of lock lever 41 does not cause rotation of nut 44 as washers 42 and thrust bearing 45 minimize any rotational movement transmitted to nut 44.

Persons skilled in the art will recognize that, during the locking operation, the biasing force of spring 43 is increased due to the cam separation. Such bias forces lock lever 41 into contact with locking plate 42.

Figure 2B:
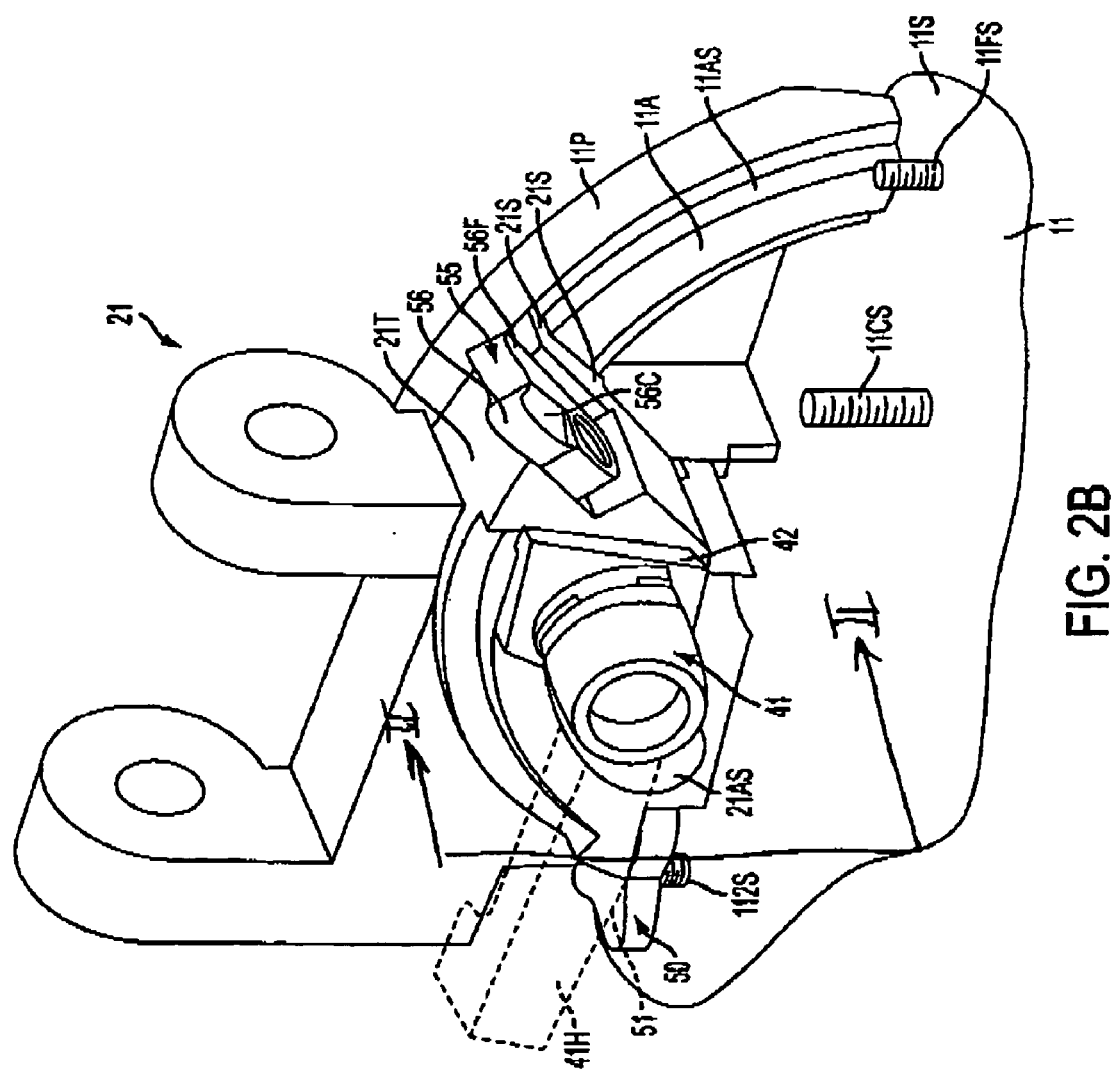

Referring to FIG. 2B, trunnion 21T may carry a first bevel stop assembly 50. Bevel stop assembly 50 may include a body 51 which is pivotally attached to trunnion 21T. Body 51 may be rotated between a first position contacting a screw 11ZS extending from table assembly 11, and a second position not contacting screw 11ZS.

Persons skilled in the art will recognize that, when body 51 is in the first position, trunnion 21T will stop beveling when body 51 contacts screw 11ZS. Preferably, screw 11ZS will be adjusted so that trunnion 21T stops beveling when trunnion 21T is at the zero degrees position, i.e., blade 23 will be substantially perpendicular to table assembly. When the body 51 is moved to the second position, trunnion 21T will effectively go past screw 11ZS, as body 51 does not contact screw 11ZS allowing a bevel angle of −3 degrees, for example.

Trunnion 21T may carry a second bevel stop assembly 55. Bevel stop assembly 55 may include a body 56 which is pivotally attached to trunnion 21T. Body 56 may be rotated between a first position contacting a screw 11FS extending from table assembly 11, a second position contacting screw 11CS extending from table assembly 11 (and not contacting screw 11FS), and a third position not contacting either screw 11FS, 11CS.

Persons skilled in the art will recognize that, when body 55 is in the first position, trunnion 21T will stop beveling when a surface 56F contacts screw 11FS. Preferably, screw 11FS will be adjusted so that trunnion 21T stops beveling when trunnion 21T is at the 45 degrees position. When the body 56 is moved to the third position, trunnion 21T will effectively go past screw 11FS, as body 56 does not contact screw 11FS, allowing a bevel angle of 48 degrees, for example.

Persons skilled in the art will recognize that, when body 55 is in the second position, trunnion 21T will stop beveling when a surface 56C contacts screw 11CS. Preferably, screw 11CS will be adjusted so that trunnion 21T stops beveling when trunnion 21T is at a predetermined angle. Such angle can be about 30 degrees, which is typically used when making compound cuts on crown molding. Preferably surface 56C is inclined relative to surface 56F.

Persons skilled in the art will recognize that the third position of body 56 is preferably between the first and second positions.

Figure 3A:
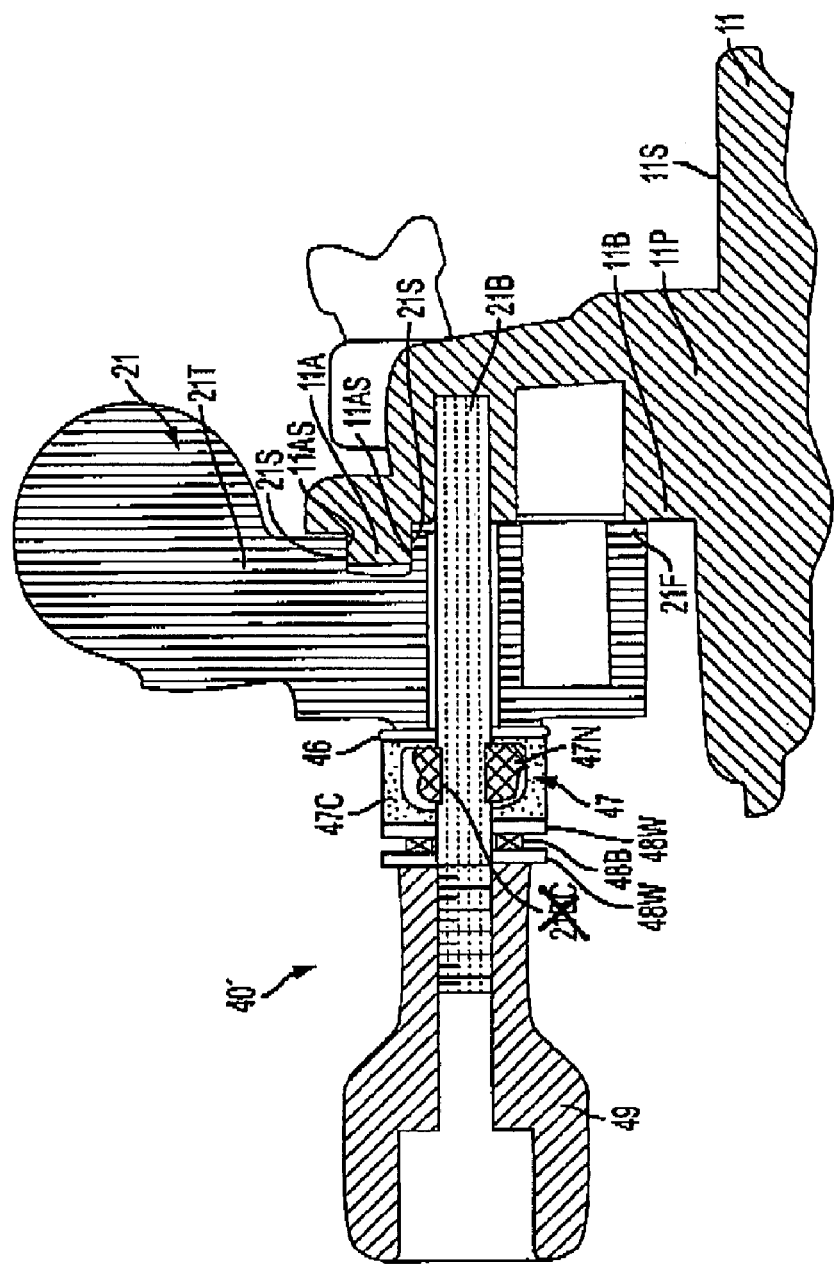
FIGS. 3A-3B are cross-sectional and front perspective views, respectively.

FIG. 3 illustrates an alternate embodiment of bevel lock mechanism 40′, where like numerals refer to like parts. The teachings of the previous embodiment are incorporated herein by reference.

In this embodiment bolt 21B is preferably press-fit or threaded into post 11P. A washer 46 is preferably disposed on bolt 21B for contacting trunnion 21T.

A cup assembly 47 is preferably disposed on bolt 21B next to washer 46. Cup assembly 47 preferably includes a cup 47C which contacts the washer 46. Cup assembly 47 may also include an elastic stop nut 47N which is disposed within cup 47C. Stop nut 47N is preferably threadingly engaged to bolt 21B, thus capturing trunnion 21T between stop nut 47N and post 11P.

A pair of washers 48W is preferably disposed on bolt 21B next to cup assembly 47. Preferably a thrust bearing 48B is disposed on bolt 21B between the pair of washers 48W. Thrust bearing 48B may be a ball bearing.

A handle 49 may be threadingly engaged to bolt 21B and contacting one of washers 48W. With such construction, the user can lock the bevel position of trunnion 21T (and thus of saw assembly 20) by rotating handle 49.

Upon rotation of handle 49, a translational force is directed through washers 48W unto cup 47C. Persons skilled in the art will recognize that thrust bearing 48B preferably isolates cup 47C from any rotational motion imparted upon the washer 48W which contacts handle 49. Cup 47C in turns moves washer 46 (and thus trunnion 21T) towards post 11P, locking trunnion 21T (and thus saw assembly 20).

Persons skilled in the art will recognize that the thread pitch of bolt 21B and/or handle 49 is preferably small to increase the clamping force for a given amount of torque. Persons skilled in the art will recognize that thrust bearing 48B may also increase the clamping force for a given amount of torque.

Persons skilled in the art will also recognize that the bolt 21B is used for both (a) capturing the trunnion 21T and maintaining it within a certain distance to post 11P, even when unlocked (by virtue of stop nut 47N) and (b) assisting in the locking process.

Figure 3B:
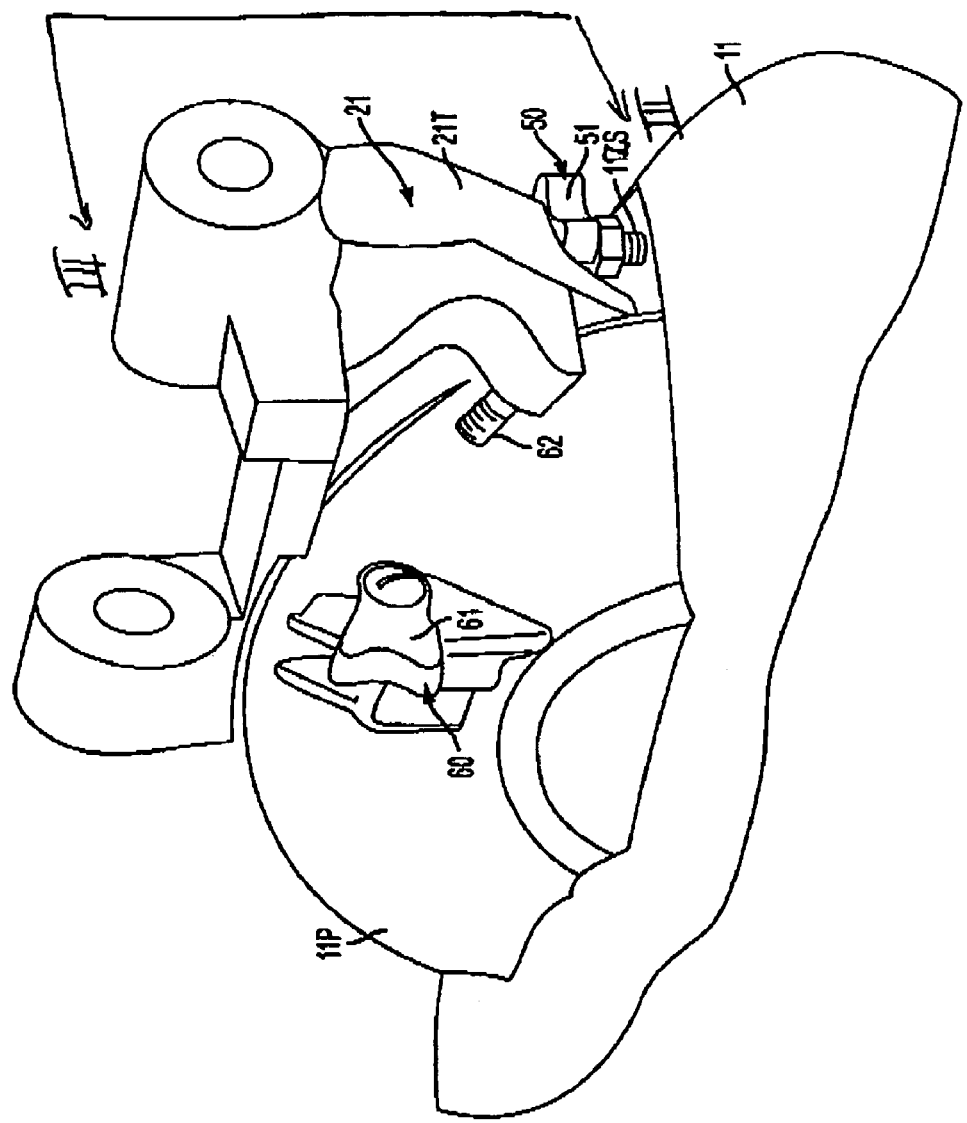

Referring to FIG. 3B, a crown bevel stop assembly 60 may be used to stop trunnion 21T (and thus saw assembly 20) at a position between the two ends of the beveling range. Such position can be the bevel angle of about 30 degrees, which is typically used when making compound cuts on crown molding.

Crown bevel stop assembly 60 may include a body 61 which is pivotally attached to post 11P, and a screw 62 which moves towards body 61 when trunnion 21T (and thus saw assembly 20) is beveled. Body 61 may be rotated between a first position which would intercept and contact screw 62 as trunnion 21T is rotated and a second position not intercepting and contacting screw 62 as trunnion 21T is rotated.

Persons skilled in the art will recognize that, when body 61 is in the first position, trunnion 21T will stop beveling when screw 62 contacts body 61. Preferably, screw 62 will be adjusted so that trunnion 21T stops beveling when trunnion 21T is at the crown cutting position, i.e., about 30 degrees.

Persons skilled in the art may recognize other additions or alternatives to the means disclosed herein. However, all these additions and/or alterations are considered to be equivalents of the present invention.

We claim:

1. A power tool comprising:
   a base assembly;
   a table supported by the base assembly, the table having a workpiece supporting surface; and
   a saw assembly pivotably supported by the table via a trunnion assembly for rotation about a bevel axis;
   wherein the table includes a post having a first curved surface having a first radius, the first curved surface has a center coincident with the bevel axis, the trunnion assembly has a first surface contacting the first curved surface at a point of contact, the trunnion assembly being movable along the first curved surface, the first radius extending through the point of contact being larger than the distance between the point of contact and the workpiece supporting surface, and and a shaft is disposed between the post and the trunnion assembly for retaining the post and the trunnion assembly in close proximity, the shaft having a longitudinal axis substantially separate and parallel to the bevel axis, the shaft remaining stationary relative to the post when the trunnion assembly is rotated relative to the post, wherein the first surface is wider than the shaft.

2. The power tool of claim 1., wherein the post has a second curved surface, the trunnion assembly contacting the second curved surface.

3. The power tool of claim 2, wherein the second curved surface has a second radius.

4. The power tool of claim 3, wherein the second radius is smaller than the first radius.

5. The power tool of claim 3, wherein the first and second curved surfaces are substantially concentric.

6. The power tool of claim 1, wherein the shaft is a bolt which extends through the post and the trunnion assembly.

7. The power tool of claim 6, further comprising a nut threadingly engaged to the bolt.

8. The power tool of claim 6, further comprising a handle rotatably disposed on the bolt.

9. The power tool of claim 8, further comprising a plate disposed between the trunnion assembly and the handle.

10. The power tool of claim 9, wherein at least one of the plate and the handle have cam surfaces.

11. The power tool of claim 8, further comprising a nut threadingly engaged to the bolt, the handle being between the nut and the trunnion assembly.

12. The power tool of claim 11, wherein at least one of a spring, a washer, and a thrust bearing is disposed between the nut and the handle.

13. The power tool of claim 8, wherein the handle is threadingly engaged to the bolt.

14. The power tool of claim 13, further comprising a cup washer being disposed between the handle and the trunnion assembly.

15. The power tool of claim 14, further comprising at least one of a washer and a thrust bearing disposed between the handle and the cup washer.

16. The power tool of claim 1, wherein at least one of the trunnion assembly and the post carry a protrusion, and the other of the at least one of the trunnion assembly and the post have a movable stop which is movable between a first position contacting the protrusion and a second position not contacting the protrusion.

17. The power tool of claim 1, wherein at least one of the trunnion assembly and the table carry a protrusion, and the other of the at least one of the trunnion assembly and the table have a movable stop which is movable between a first position contacting the protrusion and a second position not contacting the protrusion.

18. The power tool of claim 1, wherein a center of the first curved surface is disposed below the workpiece supporting surface.

19. The power tool of claim 1, wherein the table is pivotally attached to the base assembly.

20. The power tool of claim 19, wherein the table is movable between a first position where the saw assembly is disposed above the table, and a second position where the saw assembly is disposed below the table.

* * * * *